United States Patent [19]
Kraft et al.

[11] Patent Number: 4,729,628
[45] Date of Patent: Mar. 8, 1988

[54] FIBER OPTIC DROPWIRE

[75] Inventors: Heinrich A. Kraft, Roedental, Fed. Rep. of Germany; David E. Vokey, Hickory, N.C.

[73] Assignee: Siecor Corporation, Hickory, N.C.

[21] Appl. No.: 930,669

[22] Filed: Nov. 14, 1986

[51] Int. Cl.$^4$ .............................................. G02B 6/44
[52] U.S. Cl. .............................. 350/96.23; 174/117 F
[58] Field of Search ............. 174/70 A, 70 R, 113 R, 174/115, 117 F; 350/96.23

[56] References Cited

U.S. PATENT DOCUMENTS

| | | | |
|---|---|---|---|
| 4,089,585 | 4/1978 | Slaughter | 350/96.23 |
| 4,185,887 | 1/1980 | Ferrentino | 350/96.23 |
| 4,220,812 | 9/1980 | Ney et al. | 174/117 F |
| 4,467,138 | 8/1984 | Brorein | 174/115 |
| 4,468,089 | 8/1984 | Brorein | 350/96.23 |

Primary Examiner—Eugene R. LaRoche
Assistant Examiner—Steven J. Mottola
Attorney, Agent, or Firm—J. David Abernethy

[57] ABSTRACT

A fiber optic dropwire having a fiber optic transmission member between two strength members. The optical fiber has an outer coating having a higher melting point than the outer dropwire covering.

11 Claims, 4 Drawing Figures

FIBER OPTIC DROPWIRE

BACKGROUND OF THE INVENTION

1. Field of the Invention

The invention is in the field of communication dropwire.

2. Background of the Invention

A dropwire is a communication wire which extends from a terminal on a utility pole to the building being served. U.S. Pat. No. 4,467,138, issued to Brorein, incorporated herein by reference, discloses a dropwire having a copper clad steel central strength member with two side portions, at least one of the side portions containing a polyolefin jacketed optical fiber conductor. The strength member is adherently embedded in a body of PVC material and the polyolefin coated optical fiber is non-adherently embedded in the PVC material. Longitudinal weakening grooves in the dropwire facilitate separation of the central and side portions.

SUMMARY OF THE INVENTION

With the preceding information as a background, the dropwire according to the present invention has considerable advantages over the prior art. The invention calls for a generally flat communication wire having a coated optical fiber lying between two strength members. The coated optical fiber and strength members are covered with a body of plastic. While the outer strength members are adherently embedded in the outer plastic, the coated optical fiber is non-adherently placed in the outer plastic material. This is accomplished by having an outer coating on the optical fiber which has a higher melting point than the body of outer plastic which surrounds the outer coating of the optical fiber. This allows the dropwire to be processed simply, with the outer body of plastic material being capable of being extruded directly over the outer buffer coating of the optical fiber. The outer coating of the optical fiber will not be melted in the process, accomplishing the non-adhering embedding desired. A smooth, low cost inner coating on the optical fiber may be used to increase efficiency. In addition, it will readily be seen that the optical fiber has greater protection between the two strength members, whereas the prior dropwire leaves the optical fiber relatively exposed on an end portion. Finally, a longitudinally weakening groove is placed in the center of the communication wire on both flat sides, allowing the dropwire outer plastic to be split manually to provide access to the coated optical fiber. This arrangement allows access to the optical fiber without the risk of injury to it entailed by the process of cutting the outer plastic material. Objects of the invention are a dropwire having a greater service life, in that the optical fiber is protected in the center of the dropwire, and ease of access to the optical fiber for maintenance or service by utilizing the construction shown herein.

BRIEF DESCRIPTION OF THE DRAWINGS

Further details are explained below with the help of the examples illustrated in the attached drawings in which.

The same reference numbers are used throughout the drawings to designate the same or similar parts.

DETAILED DESCRIPTION OF THE PREFERRED EMBODIMENTS

Figure 1:
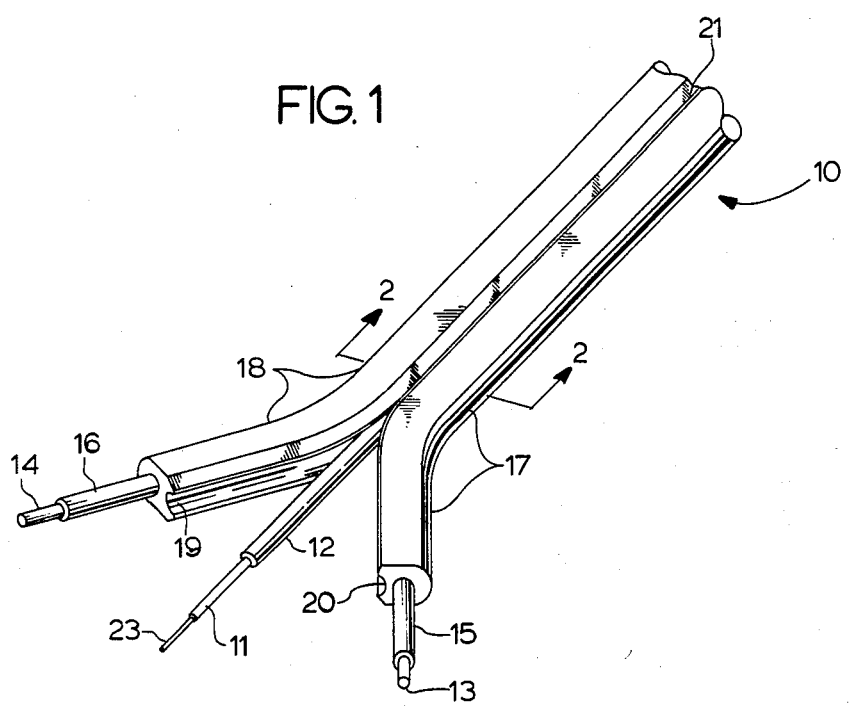
FIG. 1 is an enlarged perspective view of an end of a dropwire embodying the invention and showing access to the optical fiber.

Reference should now be had to FIG. 1, which illustrates a dropwire designated generally by the reference numeral 10 constructed in accordance with the present invention. This embodiment contains a single optical fiber conductor 23. The optical fiber 23 has a coating of nylon, 11, which in turn is coated by polyester 12. Polyester 12 is disposed in plastic 17 and 18.

Plastic 17 and 18 may be chosen from a number of suitable materials, PVC material, for example. The melting point of PVC is approximately 360° F. The melting point of the polyester should be significantly higher than the melting point and processing temperature of the outer plastic material, PVC material, for example, so that the dropwire may be efficiently processed. For example, PET, a polyester, has a melting point and processing temperature of around 500° F.

Figure 2:
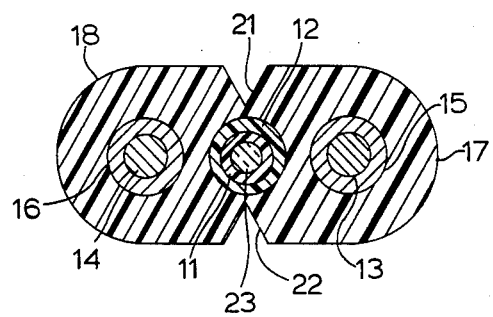
FIG. 2 is a transverse sectional view taken along line 2—2 in FIG. 1.

Dropwire 10 has a longitudinal central weakening groove 21 on the flat side in view; the side not exposed to view has a corresponding central weakening groove 22 (as shown in FIG. 2). The weakening grooves and coated optical fibers separate the remainder of the dropwire into two sections, which, once the grooves are begun to be separated, may be manually pulled apart as shown in FIG. 1. The elongated strength members in each side portion are steel, 13 and 14, respectively; which are coated with copper, 15 and 16, respectively; which are in turn respectively adherently embedded in PVC 17 and 18. It will be further seen that PVC 17 and 18 have inner side grooves 20 and 19, respectively, generally corresponding to the outer shape of polyester 12.

The generally flat nature of the communication wire is shown in FIG. 2. FIG. 2 also shows the other weakening groove, 22, in the outer plastic. The two weakening grooves are adjacent to the optical fiber and on opposite sides of it. The optical fiber lies substantially in one plane between the two strength members and also in another plane perpendicular to the first plane, also containing the two weakening grooves.

Figure 3:
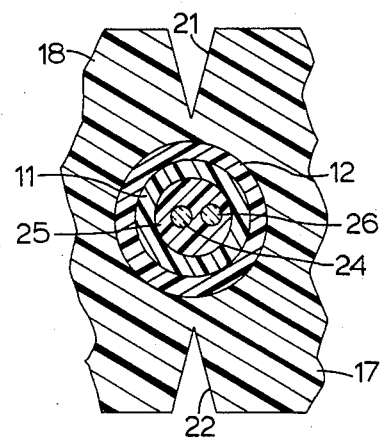
FIG. 3 is a fragmentary sectional view similar to FIG. 2, but showing a modification of the invention containing two "loose tube" optical fibers.

FIG. 3 shows how the invention may be adapted for use with one or more optical fibers in a "loose tube" construction. In this construction optical fibers 23 and 24 are loosely contained within nylon layer 11. The innerspace between nylon 11 and optical fibers 26 and 24 is filled with a filling compound or gel 25 as is well known to the art. The remainder of the construction is the same as has been previously described in FIGS. 1 and 2.

Figure 4:
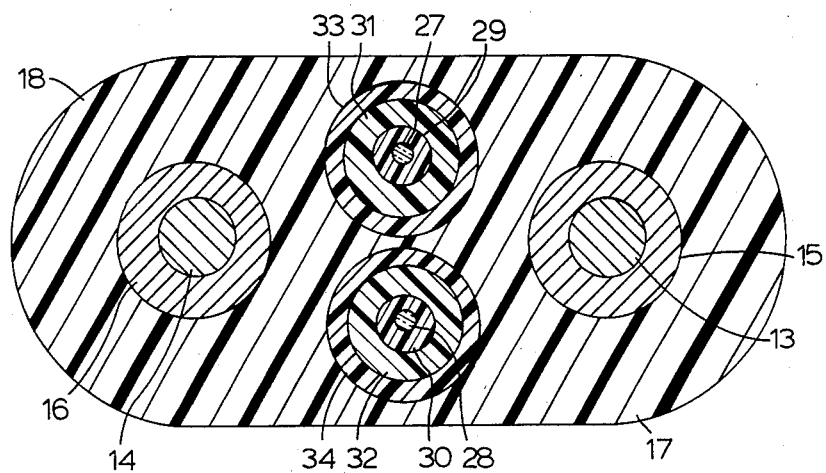
FIG. 4 is a view similar to FIG. 2, but showing "loose tube" optical fibers in separate tubes, no weakening grooves being used.

FIG. 4 shows a different construction for the invention of it is desired to place the optical fibers in separate buffer tubes. A loose tube optical fiber construction is again shown, but directly coated fibers as shown in FIG. 1 could also be used. Optical fibers 27 and 28 are surrounded by filling compound or gel 29 and 30, respectively. Filling compound 29 and 30 are within nylon coatings 31 and 32 respectively, which in turn are each coated by polyester layers 33 and 34. Since only a thin layer of outer plastic remains between the coated optical fibers and between the coated optical fibers and the outer edge of the dropwire, no weakening grooves are needed. The materials of the side strength member portions 14, 16 and 13, 15, and outer jacket 17, 18 again remain unchanged.

An inner coating of nylon around the optical fibers is desirable for several reasons; first, it performs particularly well adjacent to a filling compound; second, its surface is smoother than that of polyester, reducing possible abrasion with the fragile optical fibers; and third, at today's prices, the nylon material is less expensive than the polyester material, which allows greater efficiencies in production.

While the foregoing examples were described with reference to paticular materials, it should be obvious that they should be subject to considerable variations while retaining the basic advantages of the invention. The general dimensions of the dropwire, weakening grooves, and copper clad steel wires may all be as set out in the Brorein reference and need not be repeated here. Similarly, buffer tubes having "loose tube" optical fibers contained therein are also well known to the art.

What is claimed is:

1. A communication cable comprising:
   (a) an optical fiber having inner and outer coatings, the outer coating having a first melting point, said optical fiber disposed between two longitudinally extended strength members; and
   (b) an outer plastic jacket having a second melting point disposed around said coated optical fiber and said strength members, wherein the first melting point is higher than the second melting point; and said outer plastic jacket having two longitudinally extended grooves on opposite sides of the coated optical fiber in the plane containing the optical fiber and perpendicular to the plane containing the optical fiber and the two strength members.

2. A communication cable as recited in claim 1, wherein the inner coating on the optical fiber is nylon and the outer coating on the optical fiber is polyester, and the two longitudinally extended strength members are copper coated steel.

3. A communication cable as recited in claim 2 wherein the outer plastic jacket is polyvinyl chloride and the two longitudinally extended strength members are adherently embedded in the outer plastic jacket.

4. A communication cable comprising:
   (a) an optical fiber loosely disposed within inner and outer coatings, the outer coating having a first melting point, the inner coating delimiting a space; said space within the inner coating not occupied by an optical fiber being filled with a gel, and the optical fiber lying between two elongated strength members; and
   (b) an outer plastic jacket having a second melting point disposed around the coated optical fiber and said strength members, wherein the first melting point is higher than the second melting point; and said outer plastic jacket having two longitudinally extended grooves on opposite sides of the coated optical fiber in the plane containing the optical fiber and perpendicular to the plane containing the optical fiber and the two strength members.

5. A communication cable as recited in claim 4, wherein the inner coating on the optical fiber is nylon and the outer coating on the optical fiber is polyester, and the two longitudinally extended strength members are copper coated steel.

6. A communication cable as recited in claim 5, wherein the outer plastic jacket is polyvinyl chloride and the two longitudinally extended strength members are adherently embedded in the outer plastic jacket.

7. A communication cable as recited in claim 6, further comprising a second optical fiber disposed within the inner and outer coatings.

8. A communication cable comprising two optical fibers, each having inner and outer coatings, the outer coatings having a first melting point, disposed between two longitudinally extended strength members, the coated optical fibers and strength members disposed in an outer plastic jacket, the outer plastic jacket having a second melting point, wherein the first melting point is higher than the second melting point, the inner coating on the fibers is nylon and the outer coating on the optical fibers is polyester, and the strength members are adherently embedded in the outer plastic jacket.

9. A communication cable comprising:
   (a) an optical fiber having a coating thereon, said coating having a first melting point, said optical fiber disposed between two longitudinally extended strength members; and
   (b) an outer plastic jacket having a second melting point disposed around said coated optical fiber and said strength members, wherein the first melting point is higher than the second melting point; and said outer plastic jacket having two longitudinally extended grooves on opposite sides of the coated optical fiber in the plane containing the optical fiber and perpendicular to the plane containing the optical fiber and the two strength members.

10. A communication cable comprising:
    (a) a first optical fiber loosely disposed within a coating having a first melting point, said coating delimiting a space; said space within the coating not occupied by an optical fiber being filled with a gel, and the optical fiber lying between two elongated strength members; and
    (b) an outer plastic jacket having a second melting point disposed around the coated optical fiber and said strength members, wherein the first melting point is higher than the second melting point; and said outer plastic jacket having two longitudinally extended grooves on opposite sides of the coated optical fiber in the plane containing the optical fiber and perpendicular to the plane containing the optical fiber and the two strength members.

11. A communication cable comprising an optical fiber having inner and outer coatings, the outer optical fiber coating having a first melting point, the optical fiber disposed between two longitudinally extended strength members, the coated optical fiber and strength members disposed in an outer plastic jacket having a second melting point, the first melting point being higher than the second melting point, the inner coating being nylon and the outer coating being polyester, and the strength members being adherently embedded in the outer plastic jacket.

* * * * *